US012610378B2

(12) United States Patent
Xiao et al.

(10) Patent No.: US 12,610,378 B2
(45) Date of Patent: Apr. 21, 2026

(54) METHODS, DEVICES, AND SYSTEMS FOR DETERMINING SYNCHRONIZATION SIGNAL RASTER

(71) Applicant: ZTE Corporation, Shenzhen (CN)

(72) Inventors: Kai Xiao, Shenzhen (CN); Xing Liu, Shenzhen (CN); Peng Hao, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 290 days.

(21) Appl. No.: 18/533,472

(22) Filed: Dec. 8, 2023

(65) Prior Publication Data

US 2024/0224299 A1 Jul. 4, 2024

Related U.S. Application Data

(63) Continuation of application No. PCT/CN2021/117364, filed on Sep. 9, 2021.

(51) Int. Cl.
*H04W 72/30* (2023.01)
*H04L 5/00* (2006.01)
(Continued)

(52) U.S. Cl.
CPC ........... *H04W 72/30* (2023.01); *H04L 5/0051* (2013.01); *H04W 56/0015* (2013.01); *H04W 72/0446* (2013.01); *H04W 72/0453* (2013.01)

(58) Field of Classification Search
CPC ............. H04W 72/30; H04W 56/0015; H04W 72/0466; H04L 5/0051
See application file for complete search history.

(56) References Cited

U.S. PATENT DOCUMENTS

| | | | |
|---|---|---|---|
| 2007/0268862 A1 | 11/2007 | Singh et al. | |
| 2018/0063841 A1 | 3/2018 | Song et al. | |

(Continued)

FOREIGN PATENT DOCUMENTS

| | | |
|---|---|---|
| CN | 108702752 A | 10/2018 |
| CN | 110178440 A | 8/2019 |

(Continued)

OTHER PUBLICATIONS

International Search Report and Written Opinion regarding PCT/CN2021/117364 dated May 25, 2022, 8 pages.

(Continued)

*Primary Examiner* — Mohammad S Anwar
(74) *Attorney, Agent, or Firm* — Crowell & Moring LLP

(57) ABSTRACT

The present disclosure describes methods, systems and devices for determining synchronization signal raster. One method includes mapping a synchronization signal or physical broadcast channel (SS/PBCH) block to multiple time domain symbols in a time domain and continuous subcarriers in a frequency domain, by obtaining, by a user equipment (UE), a first number of time domain symbols in the SS/PBCH block in the time domain; obtaining, by the UE, a second number of continuous subcarriers for each time domain symbol in the SS/PBCH block in a frequency domain; and determining, by a base station, a mapping of the SS/PBCH block, the mapping comprising a set of time domain symbol numbers and subcarrier numbers in the time domain and the frequency domain.

9 Claims, 13 Drawing Sheets

600 mapping a synchronization signal or physical broadcast channel (SS/PBCH) block to multiple time domain symbols in a time domain and continuous subcarriers in a frequency domain, by obtaining, by a user equipment (UE), a first number of time domain symbols in the SS/PBCH block in the time domain;                    610 obtaining, by the UE, a second number of continuous subcarriers for each time domain symbol in the SS/PBCH block in a frequency domain                    620 determining, by a base station, a mapping of the SS/PBCH block, the mapping comprising a set of time domain symbol numbers and subcarrier numbers in the time domain and the frequency domain                    630

(51) Int. Cl.
    *H04W 56/00*     (2009.01)
    *H04W 72/0446*     (2023.01)
    *H04W 72/0453*     (2023.01)

(56)           References Cited

U.S. PATENT DOCUMENTS

| | | |
|---|---|---|
| 2020/0099493 A1 | 3/2020 | Ko et al. |
| 2021/0084576 A1 | 3/2021 | Zhu et al. |
| 2021/0168701 A1 | 6/2021 | Wu et al. |
| 2021/0345312 A1* | 11/2021 | Xie ..................... H04W 72/044 |
| 2022/0191810 A1 | 6/2022 | Tang |
| 2023/0396481 A1 | 12/2023 | Park |

FOREIGN PATENT DOCUMENTS

| | | |
|---|---|---|
| CN | 110351740 A | 10/2019 |
| CN | 111092701 A | 5/2020 |
| CN | 111356237 A | 6/2020 |
| CN | 112655180 A | 4/2021 |
| KR | 20180122925 A | 11/2018 |
| WO | WO 2021034056 A1 | 2/2021 |

OTHER PUBLICATIONS

International Search Report and Written Opinion regarding PCT/CN2021/117365 dated May 25, 2022, 8 pages.

Extended European Search Report regarding EP 21 95 6358 dated Jul. 15, 2024, 12 pages.
Dahlman Erik et al., "5G NR The Next Generation Wireless Access Technology, 2nd Edition, Chapters 1-17," In: "5G NR", Sep. 18, 2020 (Sep. 18, 2020), Elsevier, XP055908004, ISBN: 978-0-12-822320-8, pp. 1-611.
Ericsson, "Coexistence of LTE-MTC with NR," 3GPP Draft, R1-1903885, Coexistence of LTE-MTC With NR, 3rd Generation Partnership Project (3GPP), Mobile Competence Centre, 650, Route Des Lucioles, F-06921 Sophia-Antipolis Cedex, France, vol. RAN WG1, No. Xi'an, China; Apr. 8, 2019-Apr. 12, 2019 Mar. 29, 2019, XP051691130, 17 pages, Retrieved from the Internet: www.3gpp.org/ftp/tsg%5Fran/WG1 %5FRL 1 /TSGR1%5F96b/Docs/R1%2D1903885%2Ezip.
Extended European Search Report regarding EP 21 95 6359 dated Jun. 3, 2024, 12 pages.
ZTE et al. Discussion on spectrum less than 5MHz in Rel-18 11, 3GPP Draft, RP-212387, 3rd Generation Partnership Project (3GPP), Mobile Competence Centre, 650, Route Des Lucioles, F-06921 Sophia-Antipolis Cedex, France, vol. TSG RAN, No. e-Meeting, Sep. 13, 2021-Sep. 17, 2021, Sep. 6, 2021, XP052050363, 4 pages. Retrieved from the Internet: https://ftp.3gpp.org/tsg_ran/TSG_RAN/TSGR_93e/Docs/RP-212387.zipRP212387Discussion on spectrum less than 5MHz inRel-18.docx.
"User Equipment (UE) radio transmission and reception, Part 1: Range 1 Standalone"; 3GPP TS 38.101-1, V17.2.0; Jun. 2021; 62 pages.
Notice of Allowance mailed Jan. 20, 2026 in U.S. Appl. No. 18/533,380.

\* cited by examiner

400 mapping a synchronization signal or physical broadcast channel (SS/PBCH) block with a subcarrier spacing (SCS) using normal cyclic prefix (NCP) to multiple time domain symbols, by: generating, by a base station, a transmission pattern for a first time interval that includes the multiple time domain symbols for the SS/PBCH block

600 mapping a synchronization signal or physical broadcast channel (SS/PBCH) block to multiple time domain symbols in a time domain and continuous subcarriers in a frequency domain, by obtaining, by a user equipment (UE), a first number of time domain symbols in the SS/PBCH block in the time domain;          610 obtaining, by the UE, a second number of continuous subcarriers for each time domain symbol in the SS/PBCH block in a frequency domain          620 determining, by a base station, a mapping of the SS/PBCH block, the mapping comprising a set of time domain symbol numbers and subcarrier numbers in the time domain and the frequency domain          630

FIG. 6

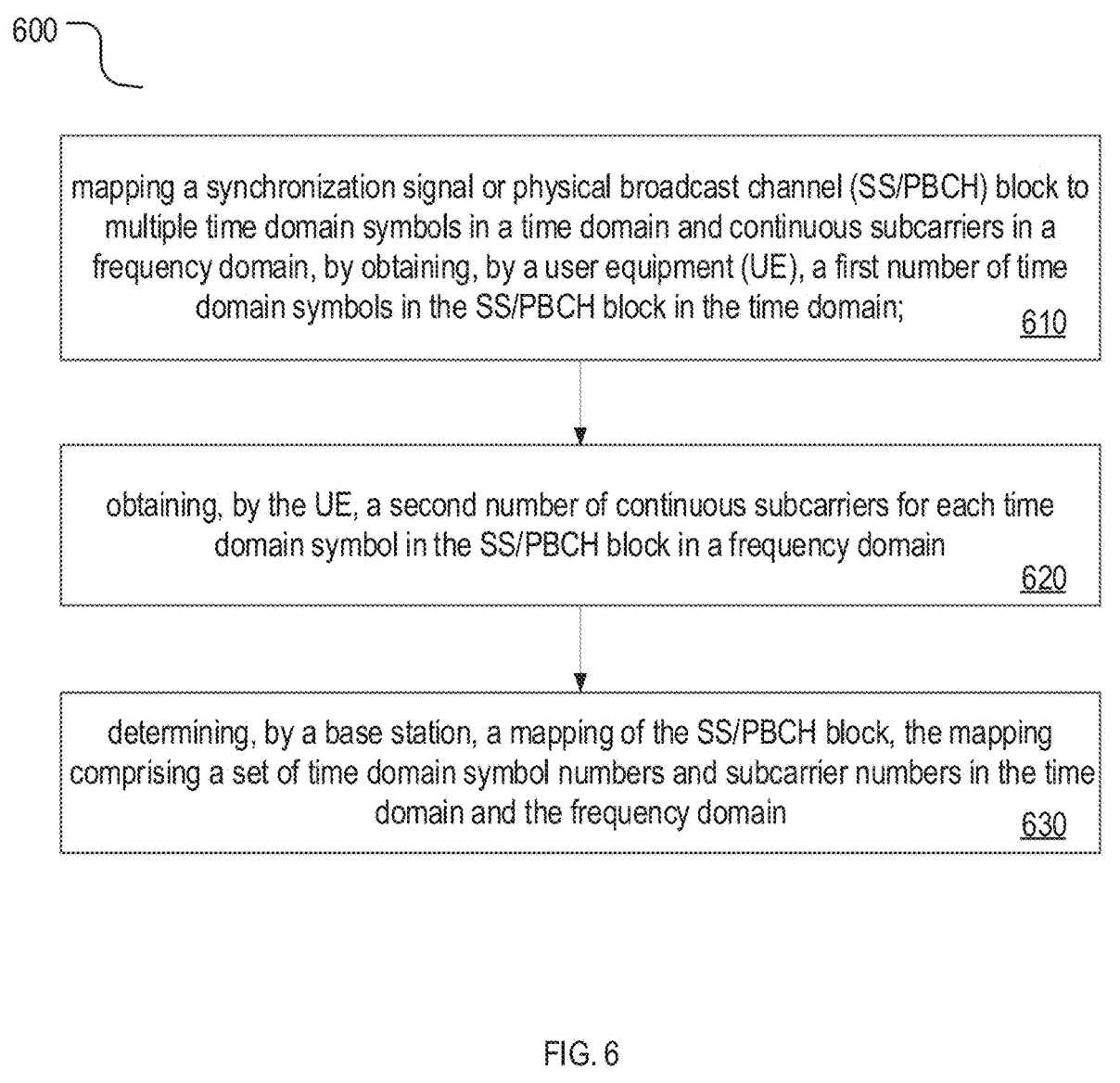

| Channel or signal | OFDM symbol number $l$ relative to the start of an SS/PBCH block | Subcarrier number $k$ relative to the start of an SS/PBCH block |
|---|---|---|
| PSS | 0 | 2, 3, ..., 127, 128 |
| SSS | 1 | 2, 3, ..., 127, 128 |
| Set to zero | 0,1 | 0, 1, 129, 130, 131 |
| PBCH | 2, 3, 4, 5, 6 | 0, 1,..., 131 |
| DM-RS for PBCH | 2, 3, 4, 5, 6 | $0+v, 4+v, 8+v, ...., 128+v$ |

FIG. 7A

| Channel or signal | OFDM symbol number $l$ relative to the start of an SS/PBCH block | Subcarrier number $k$ relative to the start of an SS/PBCH block |
|---|---|---|
| PSS | 0 | 2, 3, ..., 127, 128 |
| SSS | 2 | 2, 3, ..., 127, 128 |
| Set to zero | 0,2 | 0, 1, 129, 130, 131 |
| PBCH | 1, 3, 4, 5, 6 | 0, 1,..., 131 |
| DM-RS for PBCH | 1, 3, 4, 5, 6 | $0+v, 4+v, 8+v, ...., 128+v$ |

FIG. 7B

| Channel or signal | OFDM symbol number $l$ relative to the start of an SS/PBCH block | Subcarrier number $k$ relative to the start of an SS/PBCH block |
|---|---|---|
| PSS | 0 | 8, 9,..., 134 |
| SSS | 1 | 8, 9,..., 134 |
| Set to zero | 0, 1 | 0,...,7; 135,...,143 |
| PBCH | 2, 3, 4, 5 | 0, 1,..., 143 |
| DM-RS for PBCH | 2, 3, 4, 5 | 0+v, 4+v,..., 140+v |

FIG. 8A

| Channel or signal | OFDM symbol number $l$ relative to the start of an SS/PBCH block | Subcarrier number $k$ relative to the start of an SS/PBCH block |
|---|---|---|
| PSS | 0 | 8, 9,..., 134 |
| SSS | 2 | 8, 9,..., 134 |
| Set to zero | 0, 2 | 0,...,7; 135,...,143 |
| PBCH | 1, 3, 4, 5 | 0, 1,..., 143 |
| DM-RS for PBCH | 1, 3, 4, 5 | 0+v, 4+v,..., 140+v |

FIG. 8B

| Channel or signal | OFDM symbol number $l$ relative to the start of an SS/PBCH block | Subcarrier number $k$ relative to the start of an SS/PBCH block |
|---|---|---|
| PSS | 0 | 8, 9,..., 134 |
| SSS | 3 | 8, 9,..., 134 |
| Set to zero | 0, 3 | 0,...,7; 135,...,143 |
| PBCH | 1, 2, 4, 5 | 0, 1,..., 143 |
| DM-RS for PBCH | 1, 2, 4, 5 | 0+v, 4+v,..., 140+v |

FIG. 8C

| Channel or signal | OFDM symbol number $l$ relative to the start of an SS/PBCH block | Subcarrier number $k$ relative to the start of an SS/PBCH block |
|---|---|---|
| PSS | 0 | 32, 33, ..., 157, 158 |
| SSS | 1 | 32, 33, ..., 157, 158 |
| Set to zero | 0, 1 | 0,..., 31; 159,..., 191 |
| PBCH | 2, 3, 4 | 0, 1,..., 191 |
| DM-RS for PBCH | 2, 3, 4 | 0+v, 4+v, 8+v, ...., 188+v |

FIG. 9A

| Channel or signal | OFDM symbol number $l$ relative to the start of an SS/PBCH block | Subcarrier number $k$ relative to the start of an SS/PBCH block |
|---|---|---|
| PSS | 0 | 32, 33, ..., 157, 158 |
| SSS | 2 | 32, 33, ..., 157, 158 |
| Set to zero | 0, 2 | 0,..., 31; 159,..., 191 |
| PBCH | 1, 3, 4 | 0, 1,..., 191 |
| DM-RS for PBCH | 1, 3, 4 | 0+v, 4+v, 8+v, ...., 188+v |

FIG. 9B

| Channel or signal | OFDM symbol number $l$ relative to the start of an SS/PBCH block | Subcarrier number $k$ relative to the start of an SS/PBCH block |
|---|---|---|
| PSS | 0 | 32, 33, ..., 157, 158 |
| SSS | 2 | 32, 33, ..., 157, 158 |
| Set to zero | 0, 2 | 24,25,...,31<br>159,160,...,167 |
| PBCH | 0, 2 | 0,1,...,23<br>168,169,...,191 |
| | 1, 3 | 0,1,...,191 |
| DM-RS for PBCH | 0, 1, 2, 3 | $0+v, 4+v, 8+v, ..., 20+v$<br>$168+v, 172+v, ..., 188+v$ |

FIG. 10

METHODS, DEVICES, AND SYSTEMS FOR DETERMINING SYNCHRONIZATION SIGNAL RASTER

CROSS-REFERENCE TO RELATED APPLICATION

This application is a continuation application of PCT International Patent Application No. PCT/CN2021/117364, filed with the China National Intellectual Property Administration, PRC on Sep. 9, 2021, which is herein incorporated by reference in its entirety.

TECHNICAL FIELD

The present disclosure is directed generally to wireless communications. Particularly, the present disclosure relates to methods, devices, and systems for determining synchronization signal raster.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

With the rapid evolution of cellular mobile communication systems, more and more cells will be operated at higher frequencies. For the 5th Generation mobile communication technology, the supported minimum bandwidth may be 5 MHz in normal circumstances. In some special scenarios, such as Railway, the available frequency domain resources of some operators may be less than 5 MHz. For example, when the defined minimum bandwidth is less than 3.6 MHz, the original synchronization signal (SS) or physical broadcast channel (PBCH) block may exceed the minimum bandwidth; and the one or more resource block (RB) of SS/PBCH block that exceeds the minimum bandwidth may be punctured, resulting in performance degradation or failure to work. SSB block may include a primary synchronization signal (PSS) block and/or a secondary synchronization signal (SSS) block.

The present disclosure may address at least one of issues/problems associated with the existing system and describes various embodiments, thus improving the performance of the wireless communication.

SUMMARY

This document relates to methods, systems, and devices for wireless communication and more specifically, for determining synchronization signal raster.

In one embodiment, the present disclosure describes a method for wireless communication. The method includes mapping a synchronization signal or physical broadcast channel (SS/PBCH) block with a subcarrier spacing (SCS) using normal cyclic prefix (NCP) to multiple time domain symbols, by generating, by a base station, a transmission pattern for a first time interval that includes the multiple time domain symbols for the SS/PBCH block.

In another embodiment, the present disclosure describes a method for wireless communication. The method includes mapping a synchronization signal or physical broadcast channel (SS/PBCH) block to multiple time domain symbols in a time domain and continuous subcarriers in a frequency domain, by obtaining, by a user equipment (UE), a first number of time domain symbols in the SS/PBCH block in the time domain; obtaining, by the UE, a second number of continuous subcarriers for each time domain symbol in the SS/PBCH block in a frequency domain; and determining, by a base station, a mapping of the SS/PBCH block, the mapping comprising a set of time domain symbol numbers and subcarrier numbers in the time domain and the frequency domain.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 6 shows a flow diagram of another method for wireless communication.

FIG. 7A shows an example of an exemplary embodiment for wireless communication.

FIG. 7B shows an example of an exemplary embodiment for wireless communication.

FIG. 8A shows an example of an exemplary embodiment for wireless communication.

FIG. 8B shows an example of an exemplary embodiment for wireless communication.

FIG. 8C shows an example of an exemplary embodiment for wireless communication.

FIG. 9A shows an example of an exemplary embodiment for wireless communication.

FIG. 9B shows an example of an exemplary embodiment for wireless communication.

FIG. 10 shows an example of an exemplary embodiment for wireless communication.

DETAILED DESCRIPTION

Figure 1:
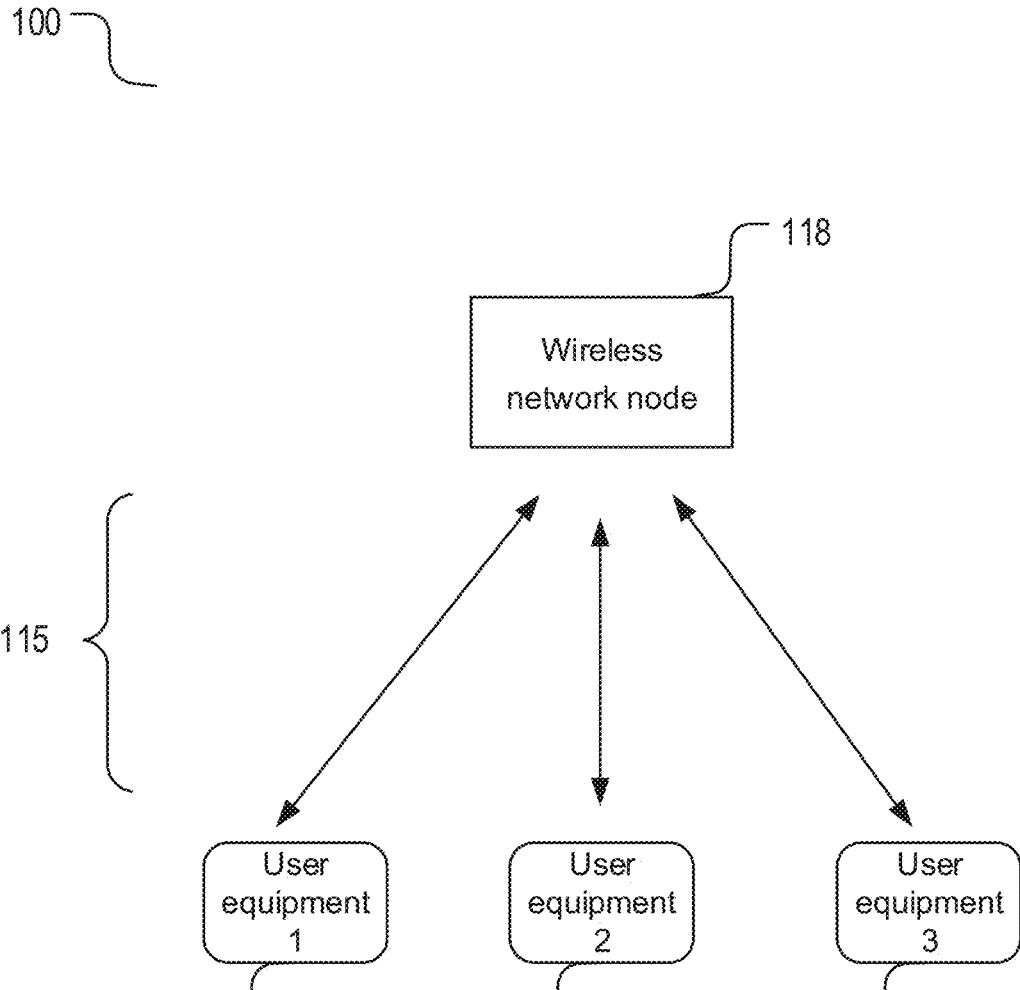
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for determining synchronization signal raster.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

With the rapid evolution of cellular mobile communication systems, more and more cells will be operated at higher frequencies. For the 5th Generation mobile communication technology, the supported minimum bandwidth may be 5 MHz in normal circumstances. In some special scenarios, such as Railway, the available frequency domain resources of some operators may be less than 5 MHz. For example, when the defined minimum bandwidth is less than 3.6 MHz, the original synchronization signal (SS) or physical broadcast channel (PBCH) block may exceed the minimum bandwidth; and the one or more resource block (RB) of SS/PBCH block that exceeds the minimum bandwidth may be punctured, resulting in performance degradation or failure to work. SSB block may include a primary synchronization signal (PSS) block and/or a secondary synchronization signal (SSS) block.

The present disclosure describes various embodiment for determining an SS/PBCH block structure, which may address at least one of issues/problems associated with the existing system and describes various embodiments, thus improving the performance of the wireless communication.

In various embodiments, to minimize the impact on performance, a single or a combination of the following methods may be used. In one method, a number of RBs punctured may be configured to be as small as possible. In another method, a new SS/PBCH block structure may be designed.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send high layer signalling to the UE 110. The high layer signalling may include configuration information for communication between the UE and the base station. In one implementation, the high layer signalling may include a radio resource control (RRC) message.

Figure 2:
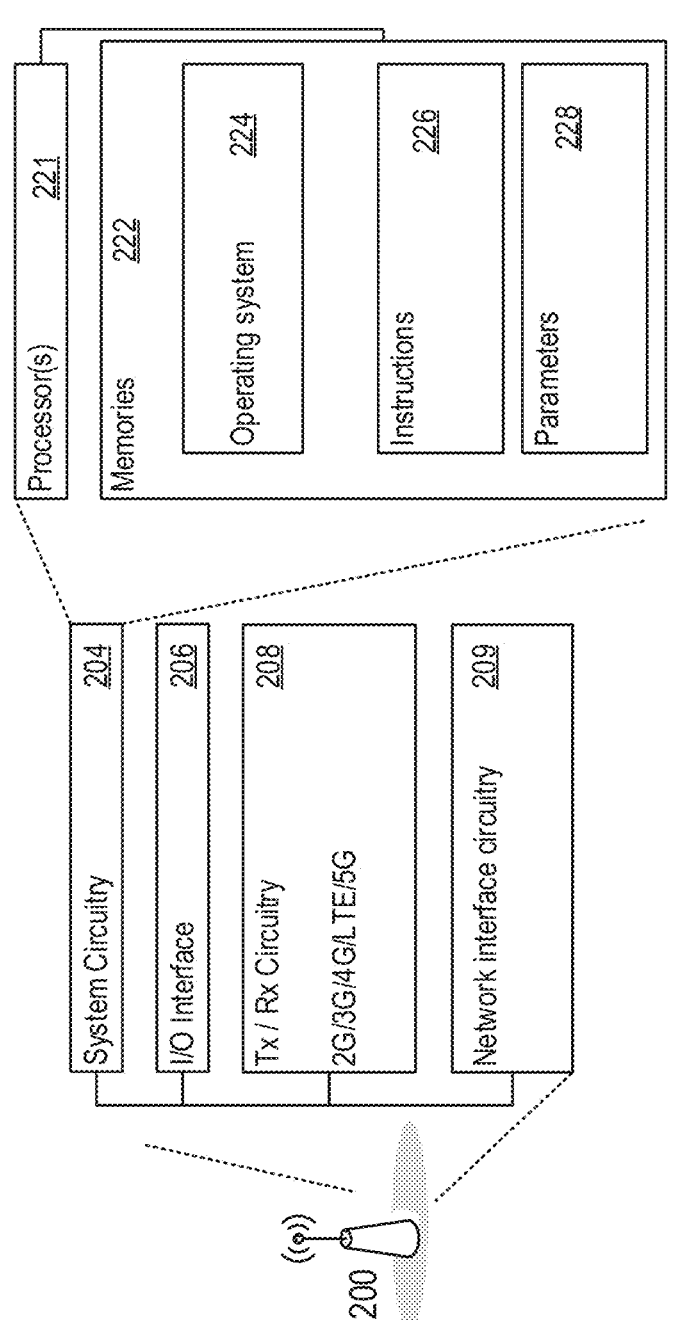
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
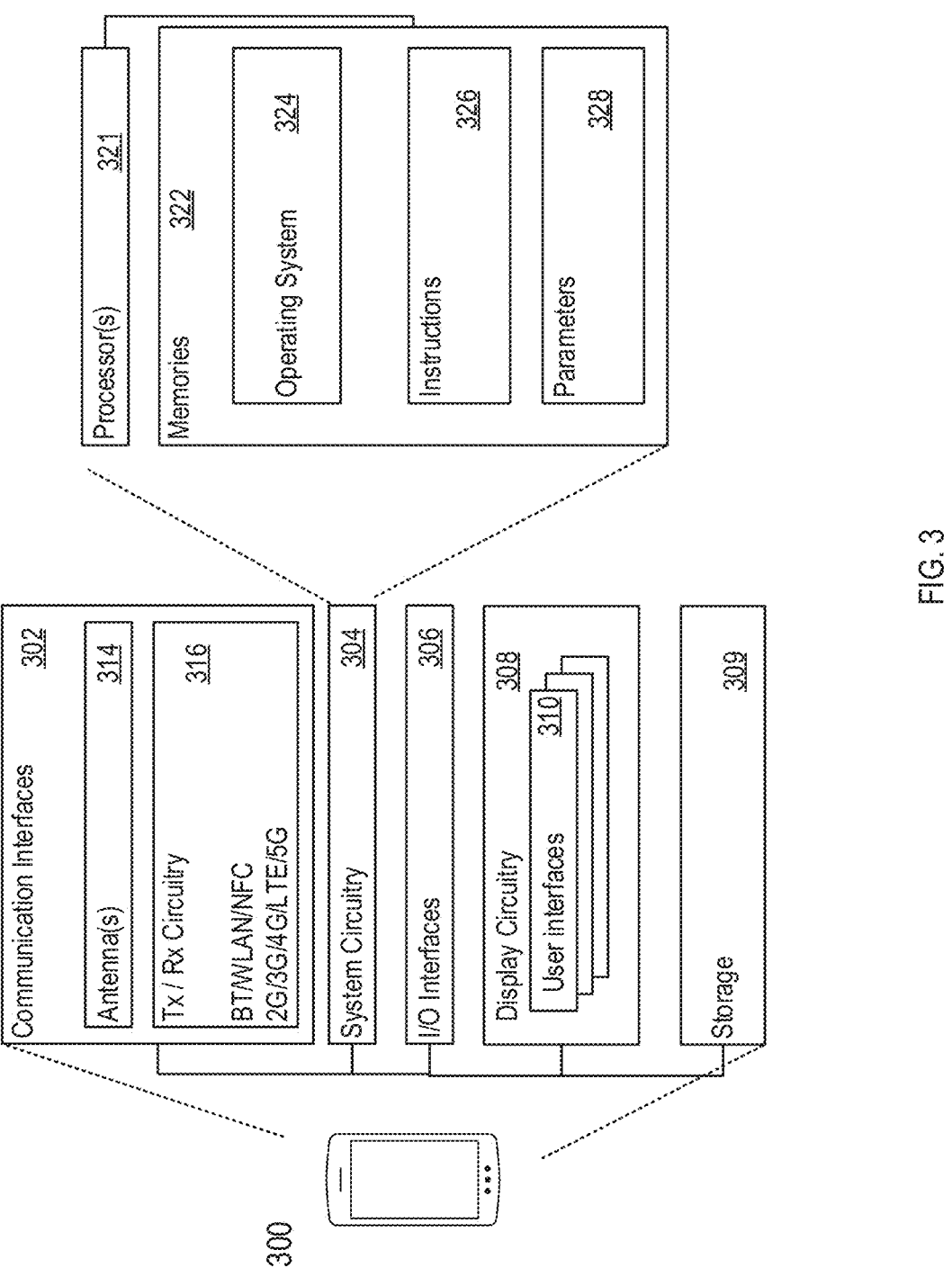
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

In various embodiments in the current 5G system, a synchronization signal or physical broadcast channel (SS/PBCH) block occupy at least one RB in the frequency domain and at least two or four consecutive time domain symbols.

Figure 4A:
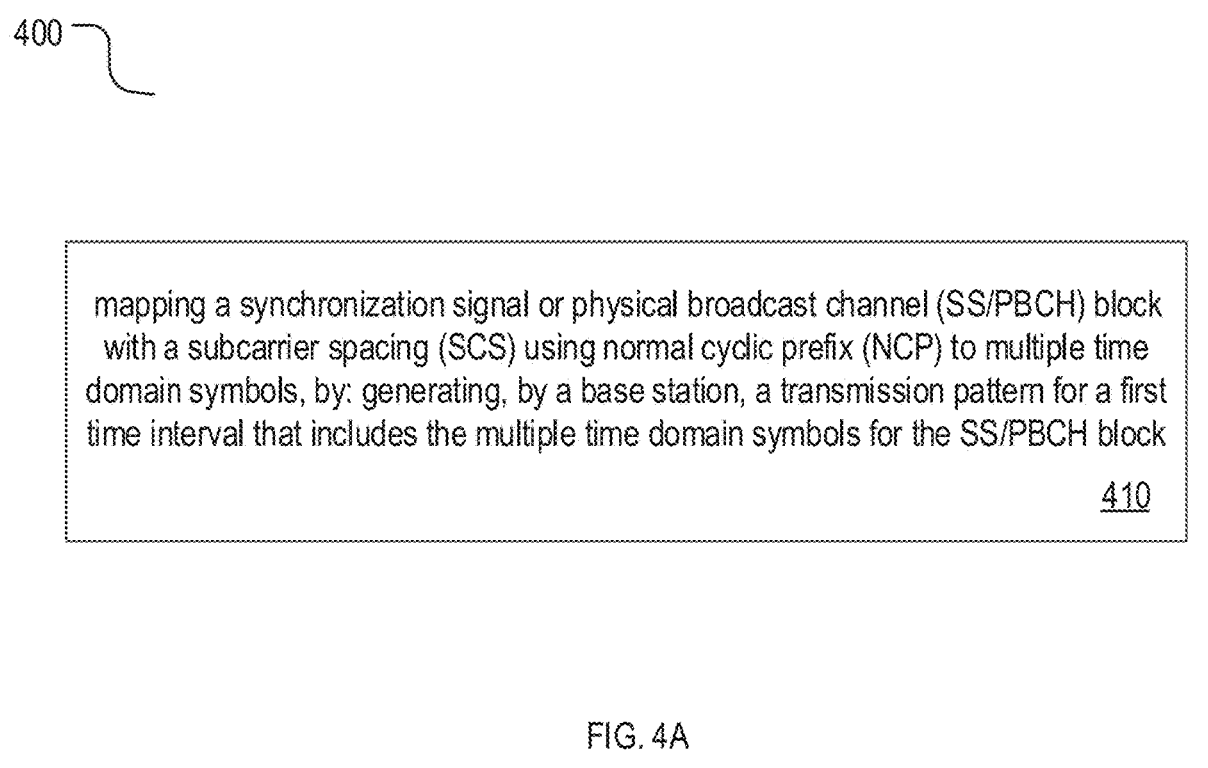
Figure 4B:
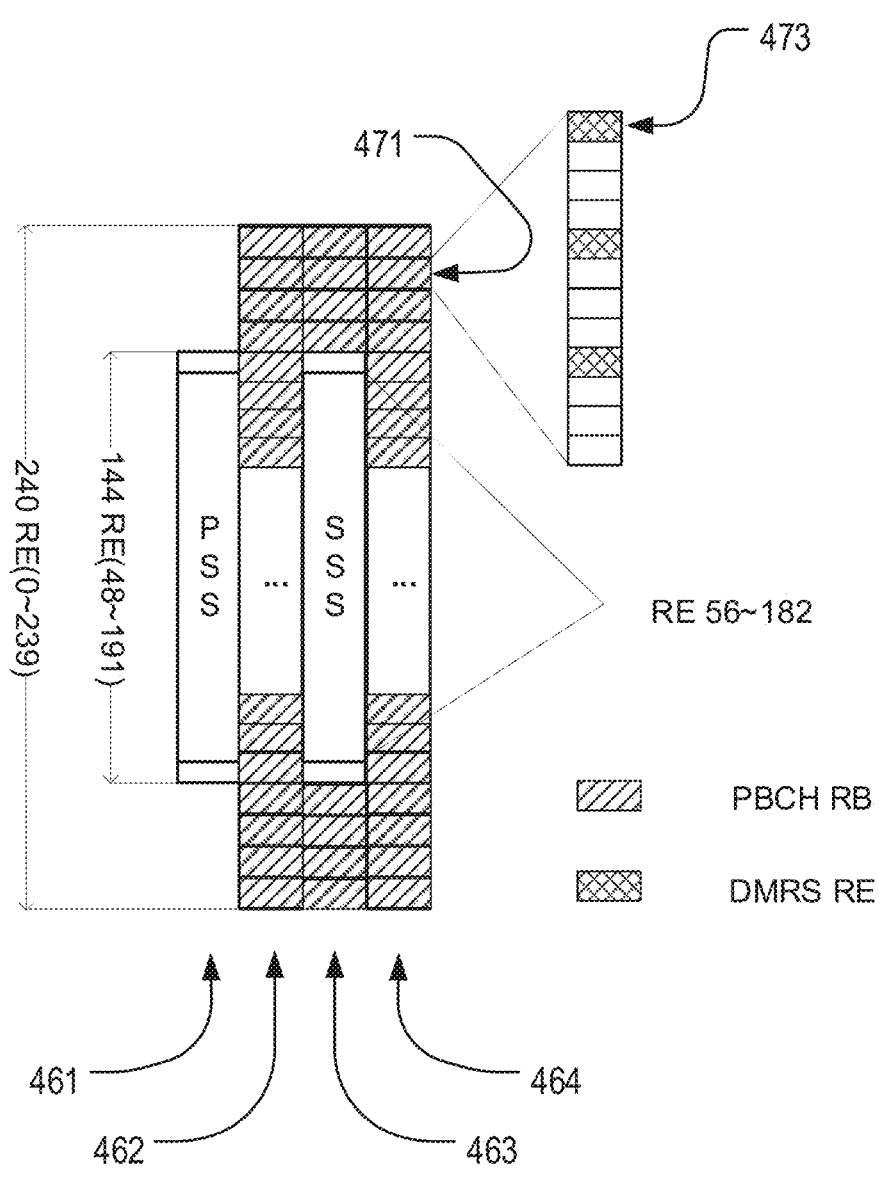
FIG. 4B shows a schematic diagram of an exemplary embodiment for wireless communication.

FIG. 4B shows an example of a current SS/PBCH block. The SS/PBCH block occupies 20 RBs in the frequency domain and 4 consecutive time domain symbols. The first symbol (461) is mapped to a primary synchronization signal (PSS), the third symbol (463) is mapped to a secondary synchronization signal (SSS) and a physical broadcast channel (PBCH), and the second symbol (462) and the fourth symbol (464) are mapped to PBCH. Each RB (471) of PBCH may include 3 demodulation reference signal (DMRS) resource elements (REs) (473) for channel estimation. In some implementations, CORESET0 occupies the frequency domain resource at least 24 RBs.

Referring to FIG. 4A, the present disclosure describes various embodiments of a method 400 for determining synchronization signal raster in wireless communication, and the method includes mapping an SS/PBCH block with a subcarrier spacing (SCS) using normal cyclic prefix (NCP) to multiple time domain symbols. The method 400 may include step 410: generating, by a base station, a transmission pattern for a first time interval that includes the multiple time domain symbols for the SS/PBCH block.

In some implementations, the SCS comprises one of 15 kHz, 30 kHz, 60 kHz, 120 kHz, 240 kHz, 480 kHz, or 960 kHz; and the first time interval includes half a radio frame, a radio frame, or multiple radio frames.

In some other implementations, each slot comprises 14 orthogonal frequency-division multiplexing (OFDM) symbols; and the 14 OFDM symbols are configured to transmit control information or data for either uplink or downlink transmission.

In some other implementations, the SCS is configured according to $2^{\mu} \cdot 15$ kHz, wherein u is a non-negative integer; and a length of a slot is configured according to $\frac{1}{2^{\mu}}$ millisecond.

In some other implementations, the first number of the OFDM symbols in each half-subframe is determined based on a period and a length of a slot.

In some other implementations, the first number of the OFDM symbols in each half-subframe is determined by $14*t/\tau$, wherein t is the period and $\tau$ is the length of the slot.

In some other implementations, the symbol index for the first OFDM symbol in each SSB group is determined based on the first number of the OFDM symbols in each half-subframe, a second number of OFDM symbols in each SSB group to map SSB, and a third number (n).

In one embodiment, the SCS is $2^{\mu} \cdot 15$ kHz, wherein u is a non-negative integer; and a symbol index for a first time symbol in each SS/PBCH block comprises $\{2, 7\}+14*n$, wherein n is from a set that includes one or more non-negative integers.

In some implementations, the SCS is 15 kHz; the period (t) is 1 millisecond; and a radio frame comprises a length of 10 millisecond.

In some other implementations, the first number of the OFDM symbols in each half-subframe comprises 14.

In some other implementations, each half radio frame comprises five half-subframes; each half-subframe comprises 1 slot; and each half-subframe comprises 14 OFDM symbols.

In some other implementations, the second number of OFDM symbols in each SSB group to map SSB comprises 5.

In some other implementations, the symbol index for the first OFDM symbol in each SSB group comprises {2, 7}+14*n, wherein n comprises an integer between 0 and k−1, inclusive; k=⌈T/τ⌉; and T is a length of a half radio frame. In some other implementations, k is determined to comprise 5.

In the embodiment, the method may include determining the time domain mapping of SS/PBCH block with a sub-carrier spacing (SCS) of 15 kHz using normal cyclic prefix (NCP).

An example is described for the embodiment of SS/PBCH block mapping with a SCS of 15 kHz using NCP. Each slot includes 14 OFDM symbols. The OFDM symbols may be used to transmit control information and data for both uplink and downlink transmissions.

Figures 5A, 5B:
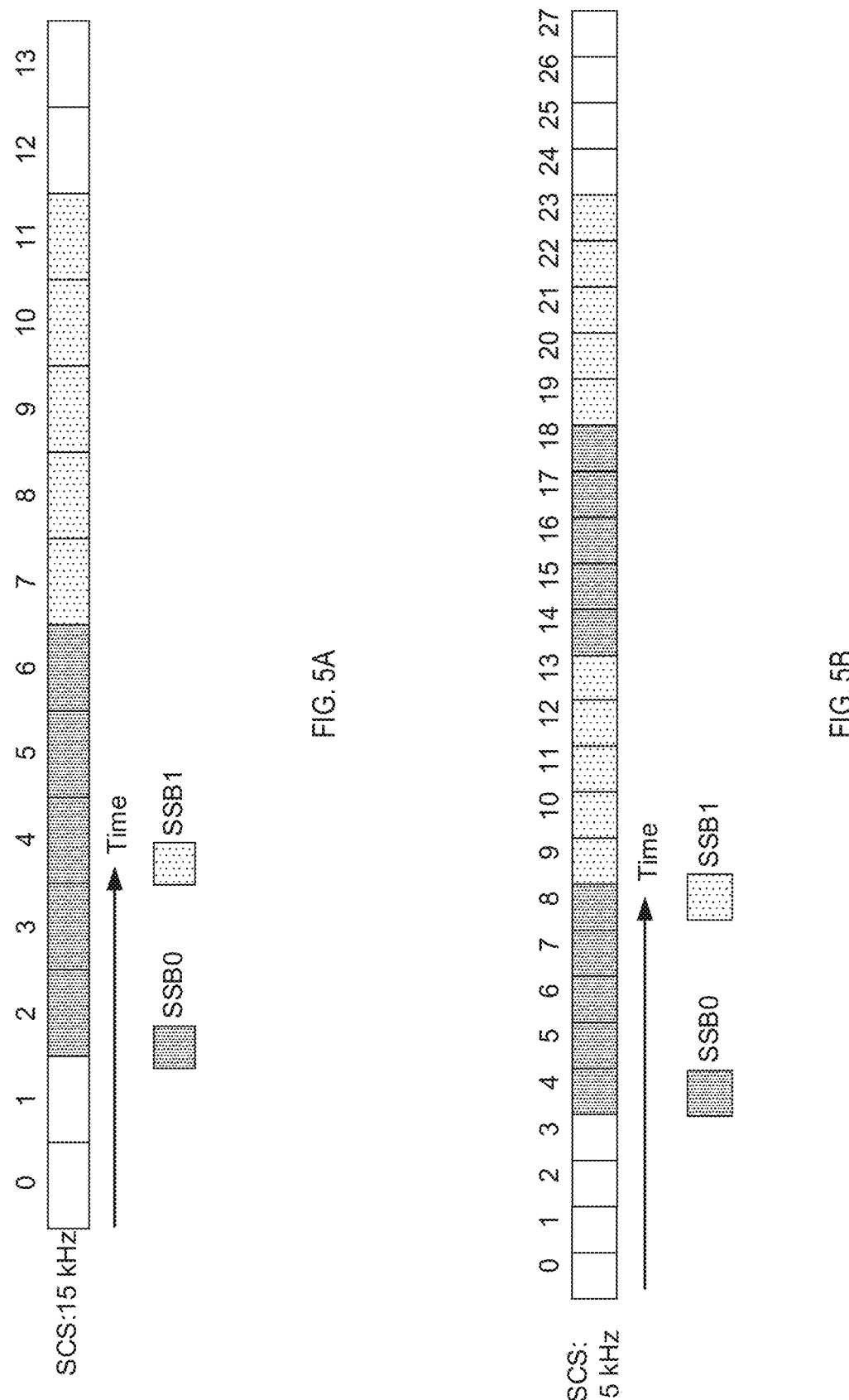
FIG. 5A shows a schematic diagram of an exemplary embodiment for wireless communication.
FIG. 5B shows a schematic diagram of an exemplary embodiment for wireless communication.

FIG. 5A shows an example mapping of the SS/PBCH blocks with a subcarrier spacing of 15 kHz in a period of t=1 millisecond (ms) in accordance with one or more embodiments of the disclosed technology. One radio frame as a length of 2×T=10 ms (that is, T=5 ms). When the subcarrier spacing is 15 kHz, the length of a slot is 1 ms. The length of a slot is 0.25 ms for subcarrier spacing of 60 kHz, and 0.5 ms for subcarrier spacing of 30 kHz.

In the embodiment, one or more SSB may be selected from multiple SSB groups, each group having multiple symbols (e.g., five symbols) to map SSB. The subcarrier spacing is $\Delta f=2^{\mu}\cdot 15$ kHz, where u is a non-negative integer. The first OFDM symbol each candidate SSB group has a symbol index of {2, 7}+n×14, where n={0, 1, . . . , k0}. In some embodiments, n can be a subset of non-negative integers selected from {0, 1, . . . , k−1}. Here, $$\left\lceil k = \frac{T}{t} \right\rceil.$$

For subcarrier spacing of 15 kHz, k=5. For example, n={0, 1}. That is, each half radio frame has 5 half-subframe that includes 1 slot (14 symbols). The symbol index of the first OFDM symbol in each candidate SS/PBCH block group is organized based on the half-subframes.

The embodiment may be applicable to support the time division multiplexing and coexistence of the control channel with the subcarrier spacing of 15 kHz.

In some other embodiments, similar design may support SSBs such as 30 kHz, 60 kHz, 120 kHz, 240 kHz, 480 kHz, and 960 kHz.

The above described method may address one or more the existing problems and improve the existing technology by at least one of the following benefits.

For one benefit, the SS/PBCH block with five symbols mapped in the time domain can operate properly.

For another benefit, in the narrowband scenario, this time domain pattern can provide more time domain symbols for mapping PBCH RB, thus ensuring PBCH performance.

In another embodiment, the SCS is $2^{\mu}\cdot 15$ kHz, wherein u is a non-negative integer; and a symbol index for a first time symbol in each SS/PBCH block comprises {4, 9, 14, 19}+28*n, wherein n is from a set that includes one or more non-negative integers.

In some implementations, the SCS is 15 kHz; the period (t) is 2 millisecond; and a radio frame comprises a length of 10 millisecond.

In some other implementations, the first number of the OFDM symbols in each half-subframe comprises 14.

In some other implementations, each half radio frame comprises five half-subframes; each half-subframe comprises 2 slots; and each half-subframe comprises 28 OFDM symbols.

In some other implementations, the second number of OFDM symbols in each SSB group to map SSB comprises 5.

In some other implementations, the symbol index for the first OFDM symbol in each SSB group comprises {4, 9, 14, 19}+28*n, wherein n comprises an integer between 0 and k−1, inclusive; k=⌈T/τ⌉; and T is a length of a half radio frame. In some other implementations, k is determined to comprise 3.

In the embodiment, the method may include determining the time domain mapping of SS/PBCH block with a SCS of 15 kHz using NCP.

An example is described for the embodiment of SS/PBCH block mapping with a SCS of 15 kHz using NCP. Each slot includes 14 OFDM symbols. The OFDM symbols may be used to transmit control information and data for both uplink and downlink transmissions.

FIG. 5B shows an example mapping of the SS/PBCH blocks with a subcarrier spacing of 15 kHz in a period of t=2 milliseconds in accordance with one or more embodiments of the disclosed technology. One radio frame as a length of 2×T=10 ms (that is, T=5 ms). When the subcarrier spacing is 15 kHz, the length of a slot is 1 ms. The length of a slot is 0.25 ms for subcarrier spacing of 60 kHz, and 0.5 ms for subcarrier spacing of 30 kHz.

In this embodiment, one or more SSB may be selected from multiple SSB groups, each group having multiple symbols (e.g., five symbols) to map SSB. The subcarrier spacing is $\Delta f=2^{\mu}\cdot 15$ kHz, where u is a non-negative integer. The first OFDM symbol each candidate SSB group has a symbol index of {4, 9, 14, 19}+n×28, where n={0, 1, . . . , k0}. In some embodiments, n can be a subset of non-negative integers selected from {0, 1, . . . , k−1}. Here, $$\left\lceil k = \frac{T}{t} \right\rceil.$$

For subcarrier spacing of 15 kHz, k=3. For example, n={0, 1}. That is, each half radio frame has 5 half-subframe that includes 2 slots (28 symbols). The symbol index of the first OFDM symbol in each candidate SS/PBCH block group is organized based on the half-subframes.

The embodiment may be applicable to support the time division multiplexing and coexistence of the control channel with the subcarrier spacing of 15 kHz.

In some embodiments, similar design may support SSBs such as 30 kHz, 60 kHz, 120 kHz, 240 kHz, 480 kHz, and 960 kHz.

The above described method may address one or more the existing problems and improve the existing technology by at least one of the following benefits.

For one benefit, the SS/PBCH block with five symbols mapped in the time domain can operate properly.

For another benefit, in the narrowband scenario, this time domain pattern can provide more time domain symbols for mapping PBCH RB, thus ensuring PBCH performance.

In another embodiment, the SCS is $2^\mu \cdot 15$ kHz, wherein u is a non-negative integer; and a symbol index for a first time symbol in each SS/PBCH block comprises {2, 8, 14, 20}+28*n, wherein n is from a set that includes one or more non-negative integers.

In some implementations, the SCS is 15 kHz; the period (t) is 2 millisecond; and a radio frame comprises a length of 10 millisecond.

In some other implementations, the first number of the OFDM symbols in each half-subframe comprises 14.

In some other implementations, each half radio frame comprises five half-subframes; each half-subframe comprises 2 slots; and each half-subframe comprises 28 OFDM symbols.

In some other implementations, the second number of OFDM symbols in each SSB group to map SSB comprises 6.

In some other implementations, the symbol index for the first OFDM symbol in each SSB group comprises {2, 8, 14, 20}+28*n, wherein n comprises an integer between 0 and k−1, inclusive; k=⌈T/τ⌉; and Tis a length of a half radio frame. In the present disclosure, ⌈ ⌉ represents a ceiling function.

In some other implementations, k is determined to comprise 3.

In the embodiment, the method may include determining the time domain mapping of SS/PBCH block with a SCS of 15 kHz using NCP.

An example is described for the embodiment of SS/PBCH block mapping with a SCS of 15 kHz using NCP. Each slot includes 14 OFDM symbols. The OFDM symbols may be used to transmit control information and data for both uplink and downlink transmissions.

Figure 5C:
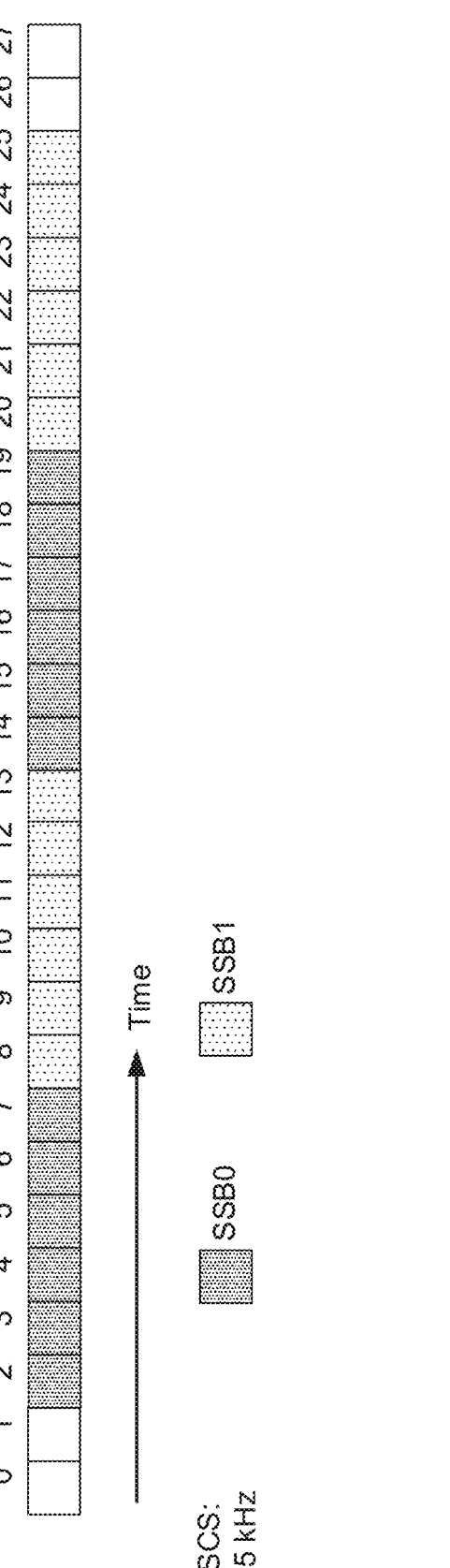
FIG. 5C shows a schematic diagram of an exemplary embodiment for wireless communication.

FIG. 5C shows an example mapping of the SS/PBCH blocks with a subcarrier spacing of 15 kHz in a period of t=2 milliseconds in accordance with one or more embodiments of the disclosed technology. One radio frame as a length of 2×T=10 ms (that is, T=5 ms). When the subcarrier spacing is 15 kHz, the length of a slot is 1 ms. The length of a slot is 0.25 ms for subcarrier spacing of 60 kHz, and 0.5 ms for subcarrier spacing of 30 kHz.

In this embodiment, one or more SSB can be selected from multiple SSB groups, each group having multiple symbols (e.g., six symbols) to map SSB. The subcarrier spacing is $\Delta f = 2^\mu \cdot 15$ kHz, where u is a non-negative integer. The first OFDM symbol each candidate SSB group has a symbol index of {2, 8, 14, 20}+n×28, where n={0, 1, . . . , k0}. In some embodiments, n can be a subset of non-negative integers selected from {0, 1, . . . , k−1}. Here, $$\left\lceil k = \frac{T}{t} \right\rceil.$$

For subcarrier spacing of 15 kHz, k=3. For example, n={0, 1}. That is, each half radio frame has 5 half-subframe that includes 2 slots (28 symbols). The symbol index of the first OFDM symbol in each candidate SS/PBCH block group is organized based on the half-subframes.

The embodiment may be applicable to support the time division multiplexing and coexistence of the control channel with the subcarrier spacing of 15 kHz.

In some embodiments, similar design can support SSBs such as 30 kHz, 60 kHz, 120 kHz, 240 kHz, 480 kHz, and 960 kHz.

The above described method may address one or more the existing problems and improve the existing technology by at least one of the following benefits.

For one benefit, the SS/PBCH block with six symbols mapped in the time domain can operate properly.

For another benefit, in the narrowband scenario, this time domain pattern can provide more time domain symbols for mapping PBCH RB, thus ensuring PBCH performance.

Referring to FIG. 6, the present disclosure describes various embodiments of a method 600 for determining an SS/PBCH block structure in wireless communication, and the method includes mapping a synchronization signal or physical broadcast channel (SS/PBCH) block to multiple time domain symbols in a time domain and continuous subcarriers in a frequency domain. The method 600 includes a portion or all of the following steps: step 610: obtaining, by a user equipment (UE), a first number of time domain symbols in the SS/PBCH block in the time domain; step 620: obtaining, by the UE, a second number of continuous subcarriers for each time domain symbol in the SS/PBCH block in a frequency domain; and step 630: determining, by a base station, a mapping of the SS/PBCH block, the mapping comprising a set of time domain symbol numbers and subcarrier numbers in the time domain and the frequency domain.

In some implementations, the SCS is 15 kHz.

In some other implementations, the SS/PBCH block, in a time domain, comprises at least one of the following: a primary synchronization signal (PSS), a secondary synchronization signal (SSS), a demodulation reference signal (DM-RS), or a PBCH.

In some other implementations, a structure of the SS/PBCH block, in a frequency domain, comprises at least one of the following: a PSS comprising at least one resource element (RE), an SSS comprising at least one RE, a DM-RS comprising at least one RE, or a PBCH comprising at least one RE.

In various embodiments of the method 600, the first number of time domain symbols in the SS/PBCH block in the time domain is determined to be 7, wherein an time domain symbol number comprises an integer between 0 and 6, inclusive.

In some implementations, the second number of continuous subcarriers for each time domain symbol in the SS/PBCH block in the frequency domain is determined to be 132, wherein a subcarrier number comprises an integer between 0 and 131, inclusive.

In one embodiment of the method 600, the mapping of the SS/PBCH block in the time domain and the frequency domain comprises at least one of the following: a PSS being configured in a first set of the time domain symbol number comprising 0 and the subcarrier number comprising an integer between 2 and 128, inclusive; an SSS being configured in a second set of the time domain symbol number comprising 1 and the subcarrier number comprising an integer between 2 and 128, inclusive; a zero value being configured in a third set of the time domain symbol number comprising an integer from {0, 1}, and the subcarrier number comprising an integer from {0, 1, 129, 130, 131}; or a PBCH being configured in a fourth set of the time domain symbol number comprising an integer from {2, 3, 4, 5, 6}, and the subcarrier number comprising an integer between 0 and 131, inclusive.

In some implementations, a DM-RS for the PBCH being configured in a fifth set of the time domain symbol number comprising an integer from {2, 3, 4, 5, 6}, and the subcarrier number comprising an integer from {0, 4, 8, . . . , 128}.

In some other implementations, a DM-RS for the PBCH is configured in a fifth set of the time domain symbol number comprising an integer from {2, 3, 4, 5, 6}, and the subcarrier number comprising an integer from {0+v, 4+v, 8+v, . . . , 128+v}, wherein v=N mod 4, and N is related to an identification (ID) of a cell where the SS/PBCH block is located.

In one embodiment of the method 600, the mapping of the SS/PBCH block in the time domain and the frequency domain comprises at least one of the following: a PSS being configured in a first set of the time domain symbol number comprising 0 and the subcarrier number comprising an integer between 2 and 128, inclusive; an SSS being configured in a second set of the time domain symbol number comprising 2 and the subcarrier number comprising an integer between 2 and 128, inclusive; a zero value being configured in a third set of the time domain symbol number comprising an integer from {0, 2}, and the subcarrier number comprising an integer from {0, 1, 129, 130, 131}; or a PBCH being configured in a fourth set of the time domain symbol number comprising an integer from {1, 3, 4, 5, 6}, and the subcarrier number comprising an integer between 0 and 131, inclusive.

In some implementations, a DM-RS for the PBCH is configured in a fifth set of the time domain symbol number comprising an integer from {1, 3, 4, 5, 6}, and the subcarrier number comprising an integer from {0, 4, 8, . . . , 128}.

In some other implementations, a DM-RS for the PBCH being configured in a fifth set of the time domain symbol number comprising an integer from {1, 3, 4, 5, 6}, and the subcarrier number comprising an integer from {0+v, 4+v, 8+v, . . . , 128+v}, wherein v=N mod 4, and N is related to an identification (ID) of a cell where the SS/PBCH block is located.

In the embodiment, the method may include determining the frequency domain mapping of SS/PBCH block with a SCS of 15 kHz using NCP.

This embodiment describes an SS/PBCH block composed of 7 time domain symbols, including PSS, SSS, DM-RS, and PBCH. In the frequency domain, the SS/PBCH block structure has at least one of the following features: the PSS, SSS, DM-RS and PBCH contain one or more RBs or REs.

In an embodiment, an SS/PBCH block consists of 7 OFDM symbols, numbered in increasing order from 0 to 6 within the SS/PBCH block, where PSS, SSS, and PBCH with associated DM-RS are mapped to symbols as shown in FIG. 7A and/or FIG. 7B.

In the embodiment, an SS/PBCH block consists of 132 contiguous subcarriers with the subcarriers numbered in increasing order from 0 to 131 within the SS/PBCH block in the frequency domain. The quantities k and l represent the frequency and time indices, respectively, within one SS/PBCH block. The UE may assume that the complex-valued symbols corresponding to resource elements denoted as 'Set to 0' in FIG. 7A and FIG. 7B are set to zero. The quantity v in FIG. 7A and FIG. 7B is given by $$v = N_{ID}^{cell}$$

mod 4, $$N_{ID}^{cell}$$

is related to the ID of the cell where the SS/PBCH block is located. Or, v may not exist in some scenarios.

The above described method may address one or more the existing problems and improve the existing technology by at least one of the following benefits.

For one benefit, the SS/PBCH block with 7 symbols mapped in the time domain can operate properly.

For another benefit, in this frequency domain mapping method, five symbols are used for mapping PBCH, and a maximum of 55 RBs resources can be provided.

For another benefit, the frequency-domain mapping method reduces the SS/PBCH block bandwidth and can be used for the supported minimum bandwidth in the narrowband scenario.

In various embodiments of the method 600, the first number of time domain symbols in the SS/PBCH block in the time domain is determined to be 6, wherein a time domain symbol number comprises an integer between 0 and 5, inclusive. In some implementations, the second number of continuous subcarriers for each time domain symbol in the SS/PBCH block in the frequency domain is determined to be 144, wherein a subcarrier number comprises an integer between 0 and 143, inclusive.

In one embodiment of the method 600, the mapping of the SS/PBCH block in the time domain and the frequency domain comprises at least one of the following: a PSS being configured in a first set of the time domain symbol number comprising 0 and the subcarrier number comprising an integer between 8 and 134, inclusive; an SSS being configured in a second set of the time domain symbol number comprising 1 and the subcarrier number comprising an integer between 8 and 134, inclusive; a zero value being configured in a third set of the time domain symbol number comprising an integer from {0, 1}, and the subcarrier number comprising an integer from {0, 1, 2, 3, 4, 5, 6, 7, 135, 136, 137, 138, 139, 140, 141, 142, 143}; or a PBCH being configured in a fourth set of the time domain symbol number comprising an integer from {2, 3, 4, 5}, and the subcarrier number comprising an integer between 0 and 143, inclusive.

In some implementations, a DM-RS for the PBCH being configured in a fifth set of the time domain symbol number comprising an integer from {2, 3, 4, 5}, and the subcarrier number comprising an integer from {0, 4, 8, . . . , 140}.

In some other implementations, a DM-RS for the PBCH is configured in a fifth set of the time domain symbol number comprising an integer from {2, 3, 4, 5}, and the subcarrier number comprising an integer from {0+v, 4+v, 8+v, . . . , 140+v}, wherein v=N mod 4, and N is related to an identification (ID) of a cell where the SS/PBCH block is located.

In another embodiment of the method 600, the mapping of the SS/PBCH block in the time domain and the frequency domain comprises at least one of the following: a PSS being configured in a first set of the time domain symbol number comprising 0 and the subcarrier number comprising an integer between 8 and 134, inclusive; an SSS being configured in a second set of the time domain symbol number comprising 2 and the subcarrier number comprising an integer between 8 and 134, inclusive; a zero value being configured in a third set of the time domain symbol number comprising an integer from {0, 2}, and the subcarrier number comprising an integer from {0, 1, 2, 3, 4, 5, 6, 7, 135, 136, 137, 138, 139, 140, 141, 142, 143}; or a PBCH being configured in a fourth set of the time domain symbol number comprising an integer from {1, 3, 4, 5}, and the subcarrier number comprising an integer between 0 and 143, inclusive.

In some implementations, a DM-RS for the PBCH is configured in a fifth set of the time domain symbol number comprising an integer from {1, 3, 4, 5}, and the subcarrier number comprising an integer from {0, 4, 8, . . . , 140}.

In some other implementations, a DM-RS for the PBCH being configured in a fifth set of the time domain symbol number comprising an integer from {1, 3, 4, 5}, and the subcarrier number comprising an integer from {0+v, 4+v, 8+v, . . . , 140+v}, wherein v=N mod 4, and N is related to an identification (ID) of a cell where the SS/PBCH block is located.

In another embodiment of the method 600, the mapping of mapping of the SS/PBCH block in the time domain and the frequency domain comprises at least one of the following: a PSS being configured in a first set of the time domain symbol number comprising 0 and the subcarrier number comprising an integer between 8 and 134, inclusive; an SSS being configured in a second set of the time domain symbol number comprising 3 and the subcarrier number comprising an integer between 8 and 134, inclusive; a zero value being configured in a third set of the time domain symbol number comprising an integer from {0, 3}, and the subcarrier number comprising an integer from {0, 1, 2, 3, 4, 5, 6, 7, 135, 136, 137, 138, 139, 140, 141, 142, 143}; or a PBCH being configured in a fourth set of the time domain symbol number comprising an integer from {1, 2, 4, 5}, and the subcarrier number comprising an integer between 0 and 143, inclusive.

In some implementations, a DM-RS for the PBCH is configured in a fifth set of the time domain symbol number comprising an integer from {1, 2, 4, 5}, and the subcarrier number comprising an integer from {0, 4, 8, . . . , 140}.

In some other implementations, a DM-RS for the PBCH being configured in a fifth set of the time domain symbol number comprising an integer from {1, 2, 4, 5}, and the subcarrier number comprising an integer from {0+v, 4+v, 8+v, . . . , 140+v}, wherein v=N mod 4, and N is related to an identification (ID) of a cell where the SS/PBCH block is located.

In the embodiment, the method may include determining the frequency domain mapping of SS/PBCH block with a SCS of 15 kHz using NCP.

This embodiment describes an SS/PBCH block composed of 6 time domain symbols, including PSS, SSS, DM-RS, and PBCH. In the frequency domain, the SS/PBCH block structure has at least one of the following features: The PSS, SSS, DM-RS and PBCH contain one or more RBs or REs.

In the embodiment, an SS/PBCH block consists of 6 OFDM symbols, numbered in increasing order from 0 to 5 within the SS/PBCH block, where PSS, SSS, and PBCH with associated DM-RS are mapped to symbols as given by FIG. 8A, or/and FIG. 8B, or/and FIG. 8C.

In the embodiment, an SS/PBCH block consists of 144 contiguous subcarriers with the subcarriers numbered in increasing order from 0 to 143 within the SS/PBCH block in the frequency domain. The quantities k and l represent the frequency and time indices, respectively, within one SS/PBCH block. The UE may assume that the complex-valued symbols corresponding to resource elements denoted as 'Set to 0' in FIG. 8A, FIG. 8B, and FIG. 8C are set to zero. The quantity v in FIG. 8A, FIG. 8B, and FIG. 8C is given by $$v = N_{ID}^{cell}$$

mod 4, $$N_{ID}^{cell}$$

is related to the ID of the cell where the SS/PBCH block is located. Or, v may not exist in some scenarios.

The above described method may address one or more the existing problems and improve the existing technology by at least one of the following benefits.

For one benefit, the SS/PBCH block with 6 symbols mapped in the time domain can operate properly.

For another benefit, in this frequency domain mapping method, 4 symbols are used for mapping PBCH, and a maximum of 48 RBs resources can be provided.

For another benefit, the frequency-domain mapping method reduces the SS/PBCH block bandwidth and can be used for the supported minimum bandwidth in the narrow-band scenario.

In various embodiments of the method 600, the first number of time domain symbols in the SS/PBCH block in the time domain is determined to be 5, wherein a time domain symbol number comprises an integer between 0 and 4, inclusive. In some implementations, the second number of continuous subcarriers for each time domain symbol in the SS/PBCH block in the frequency domain is determined to be 192, wherein a subcarrier number comprises an integer between 0 and 191, inclusive.

In one embodiment of the method 600, the mapping of the SS/PBCH block in the time domain and the frequency domain comprises at least one of the following: a PSS being configured in a first set of the time domain symbol number comprising 0 and the subcarrier number comprising an integer between 32 and 158, inclusive; an SSS being configured in a second set of the time domain symbol number comprising 1 and the subcarrier number comprising an integer between 32 and 158, inclusive; a zero value being configured in a third set of the time domain symbol number comprising an integer from {0, 1}, and the subcarrier number comprising an integer between 0 and 31, inclusive, and between 159 and 191, inclusive; or a PBCH being configured in a fourth set of the time domain symbol number comprising an integer from {2, 3, 4}, and the subcarrier number comprising an integer between 0 and 191, inclusive.

In some implementations, a DM-RS for the PBCH being configured in a fifth set of the time domain symbol number comprising an integer from {2, 3, 4}, and the subcarrier number comprising an integer from {0, 4, 8, . . . , 188}.

In some other implementations, a DM-RS for the PBCH is configured in a fifth set of the time domain symbol number comprising an integer from {2, 3, 4}, and the subcarrier number comprising an integer from {0+v, 4+v, 8+v, . . . , 188+v}, wherein v=N mod 4, and N is related to an identification (ID) of a cell where the SS/PBCH block is located.

In another embodiment of the method 600, the mapping of the SS/PBCH block in the time domain and the frequency domain comprises at least one of the following: a PSS being configured in a first set of the time domain symbol number comprising 0 and the subcarrier number comprising an integer between 32 and 158, inclusive; an SSS being configured in a second set of the time domain symbol number comprising 2 and the subcarrier number comprising an integer between 32 and 158, inclusive; a zero value being configured in a third set of the time domain symbol number comprising an integer from {0, 2}, and the subcarrier number comprising an integer between 0 and 31, inclusive, and between 159 and 191, inclusive; or a PBCH being configured in a fourth set of the time domain symbol number comprising an integer from {1, 3, 4}, and the subcarrier number comprising an integer between 0 and 191, inclusive.

In some implementations, a DM-RS for the PBCH is configured in a fifth set of the time domain symbol number comprising an integer from {1, 3, 4}, and the subcarrier number comprising an integer from {0, 4, 8, . . . , 188}.

In some other implementations, a DM-RS for the PBCH being configured in a fifth set of the time domain symbol number comprising an integer from {1, 3, 4}, and the subcarrier number comprising an integer from {0+v, 4+v, 8+v, . . . , 188+v}, wherein v=N mod 4, and N is related to an identification (ID) of a cell where the SS/PBCH block is located.

In the embodiment, the method may include determining the frequency domain mapping of SS/PBCH block with a SCS of 15 kHz using NCP.

This embodiment describes an SS/PBCH block composed of 5 time domain symbols, including PSS, SSS, DM-RS, and PBCH. In the frequency domain, the SS/PBCH block structure has at least one of the following features: The PSS, SSS, DM-RS and PBCH contain one or more RBs or REs.

In an embodiment, an SS/PBCH block consists of 5 OFDM symbols, numbered in increasing order from 0 to 4 within the SS/PBCH block, where PSS, SSS, and PBCH with associated DM-RS are mapped to symbols as given by FIG. 9A and/or FIG. 9B.

In the embodiment, an SS/PBCH block consists of 192 contiguous subcarriers with the subcarriers numbered in increasing order from 0 to 191 within the SS/PBCH block in the frequency domain. The quantities k and l represent the frequency and time indices, respectively, within one SS/PBCH block. The UE may assume that the complex-valued symbols corresponding to resource elements denoted as 'Set to 0' in FIG. 9A and/or FIG. 9B are set to zero. The quantity v in FIG. 9A and/or FIG. 9B is given by $$v = N_{ID}^{cell}$$

mod 4, $$N_{ID}^{cell}$$

is related to the ID of the cell where the SS/PBCH block is located. Or, v may not exist in some scenarios.

The above described method may address one or more the existing problems and improve the existing technology by at least one of the following benefits.

For one benefit, the SS/PBCH block with 5 symbols mapped in the time domain can operate properly.

For another benefit, in this frequency domain mapping method, 3 symbols are used for mapping PBCH, and a maximum of 48 RBs resources can be provided.

For another benefit, the frequency-domain mapping method reduces the SS/PBCH block bandwidth and can be used for the supported minimum bandwidth in the narrow-band scenario.

In various embodiments of the method 600, the first number of time domain symbols in the SS/PBCH block in the time domain is determined to be 4, wherein an time domain symbol number comprises an integer between 0 and 3, inclusive. In some implementations, the second number of continuous subcarriers for each time domain symbol in the SS/PBCH block in the frequency domain is determined to be 192, wherein a subcarrier number comprises an integer between 0 and 191, inclusive.

In one embodiment of the method 600, the mapping of the SS/PBCH block in the time domain and the frequency domain comprises at least one of the following: a PSS being configured in a first set of the time domain symbol number comprising 0 and the subcarrier number comprising an integer between 32 and 158, inclusive; an SSS being configured in a second set of the time domain symbol number comprising 2 and the subcarrier number comprising an integer between 32 and 158, inclusive; a zero value being configured in a third set of the time domain symbol number comprising an integer from {0, 2}, and the subcarrier number comprising an integer between 24 and 31, inclusive, and between 159 and 167, inclusive; or a PBCH being configured in a fourth set of the time domain symbol number comprising an integer from {0, 2}, and the subcarrier number comprising an integer between 0 and 23, inclusive, and between 168 and 191, inclusive; and the time domain symbol number comprising an integer from {1, 3}, and the subcarrier number comprising an integer between 0 and 191, inclusive.

In some implementations, a DM-RS for the PBCH being configured in a fifth set of the time domain symbol number comprising an integer from {0, 1, 2, 3}, and the subcarrier number comprising an integer from {0, 4, 8, 12, 16, 20, 168, 172, 176, 180, 184, 188}.

In some other implementations, a DM-RS for the PBCH is configured in a fifth set of the time domain symbol number comprising an integer from {0, 1, 2, 3}, and the subcarrier number comprising an integer from {0+v, 4+v, 8+v, 12+v, 16+v, 20+v, 168+v, 172+v, 176+v, 180+v, 184+v, 188+v}, wherein v=N mod 4, and N is related to an identification (ID) of a cell where the SS/PBCH block is located.

In the embodiment, the method may include determining the frequency domain mapping of SS/PBCH block with a SCS of 15 kHz using NCP.

This embodiment describes an SS/PBCH block composed of 4 time domain symbols, including PSS, SSS, DM-RS, and PBCH. In the time domain, the SS/PBCH block structure has at least one of the following features: The PBCH is mapped to the above four consecutive time domain symbols; The PSS is mapped to the first symbol; The SSS is mapped to the third symbol. In the frequency domain, the SS/PBCH block structure has at least one of the following features: The PSS, SSS, DM-RS and PBCH contain one or more RBs or REs; The PBCH with associated DM-RS and the PSS frequency division mapping on at least one symbol; The PBCH with associated DM-RS and the SSS frequency division mapping on at least one symbol; The PBCH RE outside the bandwidth of PSS/SSS is mapped to DM-RS on at least one symbol; The PBCH RE inside the bandwidth of PSS/SSS is not mapped to DM-RS on at least one symbol.

In an embodiment, an SS/PBCH block consists of 4 OFDM symbols, numbered in increasing order from 0 to 3 within the SS/PBCH block, where PSS, SSS, and PBCH with/without associated DM-RS are mapped to symbols as given by FIG. 10.

In the embodiment, an SS/PBCH block consists of 192 contiguous subcarriers with the subcarriers numbered in increasing order from 0 to 191 within the SS/PBCH block in the frequency domain. The quantities k and l represent the frequency and time indices, respectively, within one SS/PBCH block. The UE may assume that the complex-valued symbols corresponding to resource elements denoted as 'Set to 0' in FIG. 10 are set to zero. The quantity v in FIG. 10 is given by $$v = N_{ID}^{cell}$$

mod 4, $$N_{ID}^{cell}$$

is related to the ID of the cell where the SS/PBCH block is located. Or, v may not exist in some scenarios.

The above described method may address one or more the existing problems and improve the existing technology by at least one of the following benefits.

For one benefit, the SS/PBCH block with 4 symbols mapped in the time domain can operate properly, and the SS/PBCH block can reuse the time domain pattern in the current specification.

For another benefit, the PBCH payload does not change, and the SSS can be used to estimate the channel of the PBCH without DM-RS.

For another benefit, the frequency-domain mapping method reduces the SS/PBCH block bandwidth and can be used for the supported minimum bandwidth in the narrowband scenario.

The present disclosure describes methods, apparatus, and computer-readable medium for wireless communication. The present disclosure addressed the issues with determining synchronization signal raster. The methods, devices, and computer-readable medium described in the present disclosure may facilitate the performance of wireless transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:

determining a mapping of a synchronization signal or physical broadcast channel (SS/PBCH) block to multiple time domain symbols in a time domain and continuous subcarriers in a frequency domain, the mapping comprising a set of time domain symbol numbers and subcarrier numbers in the time domain and the frequency domain, by:

obtaining, by a user equipment (UE), a first number of time domain symbols in the SS/PBCH block in the time domain; and obtaining, by the UE, a second number of continuous subcarriers for each time domain symbol in the SS/PBCH block in a frequency domain, wherein:

the first number of time domain symbols in the SS/PBCH block in the time domain is determined to be 7 with a time domain symbol number comprising an integer between 0 and 6, inclusive, or the second number of continuous subcarriers for each time domain symbol in the SS/PBCH block in the frequency domain is determined to be 132 with a subcarrier number comprising an integer between 0 and 131, inclusive; and the mapping of the SS/PBCH block in the time domain and the frequency domain comprises at least one of the following: (1) a primary synchronization signal (PSS) being configured in a first set of the time domain symbol number comprising 0 and the subcarrier number comprising an integer between 2 and 128, inclusive, (2) a secondary synchronization signal (SSS) being configured in a second set of the time domain symbol number comprising 1 and the subcarrier number comprising an integer between 2 and 128, inclusive, (3) a zero value being configured in a third set of the time domain symbol number comprising an integer from {0, 1}, and the subcarrier number comprising an integer from {0, 1, 129, 130, 131}, or (4) a PBCH being configured in a fourth set of the time domain symbol number comprising an integer from {2, 3, 4, 5, 6}, and the subcarrier number comprising an integer between 0 and 131, inclusive; or the first number of time domain symbols in the SS/PBCH block in the time domain is determined to be 6 with a time domain symbol number comprising an integer between 0 and 5, inclusive, or the second number of continuous subcarriers for each time domain symbol in the SS/PBCH block in the frequency domain is determined to be 144 with a subcarrier number comprising an integer between 0 and 143, inclusive; and the mapping of the SS/PBCH block in the time domain and the frequency domain comprises at least one of the following: (1) a PSS being configured in a first set of the time domain symbol number comprising 0 and the subcarrier number comprising an integer between 8 and 134, inclusive, (2) an SSS being configured in a second set of the time domain symbol number comprising 3 and the subcarrier number comprising an integer between 8 and 134, inclusive, (3) a zero value being configured in a third set of the time domain symbol number comprising an integer from {0, 3}, and the subcarrier number comprising an integer from {0, 1, 2, 3, 4, 5, 6, 7, 135, 136, 137, 138, 139, 140, 141, 142, 143}, or (4) a PBCH being configured in a fourth set of the time domain symbol number comprising an integer from {1, 2, 4, 5}, and the subcar-
rier number comprising an integer between 0 and
143, inclusive; or
the first number of time domain symbols in the
SS/PBCH block in the time domain is determined to
be 5 with a time domain symbol number comprising
an integer between 0 and 4, inclusive, or the second
number of continuous subcarriers for each time
domain symbol in the SS/PBCH block in the fre-
quency domain is determined to be 192 with sub-
carrier number comprising an integer between 0 and
191, inclusive; and the mapping of the SS/PBCH
block in the time domain and the frequency domain
comprises at least one of the following: (1) a PSS
being configured in a first set of the time domain
symbol number comprising 0 and the subcarrier
number comprising an integer between 32 and 158,
inclusive, (2) an SSS being configured in a second
set of the time domain symbol number comprising 1
and the subcarrier number comprising an integer
between 32 and 158, inclusive, (3) a zero value being
configured in a third set of the time domain symbol
number comprising an integer from {0, 1}, and the
subcarrier number comprising an integer between 0
and 31, inclusive, and between 159 and 191, inclu-
sive, or (4) a PBCH being configured in a fourth set
of the time domain symbol number comprising an
integer from {2, 3, 4} and the subcarrier number
comprising an integer between 0 and 191, inclusive;
or
the first number of time domain symbols in the
SS/PBCH block in the time domain is determined to
be 4 with a time domain symbol number comprising
an integer between 0 and 3, inclusive, or the second
number of continuous subcarriers for each time
domain symbol in the SS/PBCH block in the fre-
quency domain is determined to be 192 with a
subcarrier number comprising an integer between 0
and 191, inclusive; and the mapping of the SS/PBCH
block in the time domain and the frequency domain
comprises at least one of the following: (1) a PSS
being configured in a first set of the time domain
symbol number comprising 0 and the subcarrier
number comprising an integer between 32 and 158,
inclusive, (2) an SSS being configured in a second
set of the time domain symbol number comprising 2
and the subcarrier number comprising an integer
between 32 and 158, inclusive, (3) a zero value being
configured in a third set of the time domain symbol
number comprising an integer from {0, 2} and the
subcarrier number comprising an integer between 24
and 31, inclusive, and between 159 and 167, inclu-
sive, or (4) a PBCH being configured in a fourth set
of the time domain symbol number comprising an
integer from {0, 2} and the subcarrier number com-
prising an integer between 0 and 23, inclusive, and
between 168 and 191, inclusive, and the time domain
symbol number comprising an integer from {1, 3},
and the subcarrier number comprising an integer
between 0 and 191, inclusive.

2. The method according to claim 1, wherein:
the SS/PBCH block, in a time domain, comprises: the
PSS, the SSS, a demodulation reference signal (DM-
RS), or the PBCH.

3. The method according to claim 1, wherein:
a structure of the SS/PBCH block, in a frequency domain,
comprises:

the PSS comprising at least one resource element (RE),
the SSS comprising at least one RE,
a DM-RS comprising at least one RE, and
the PBCH comprising at least one RE.

4. The method according to claim 1, wherein, when the
first number of time domain symbols in the SS/PBCH block
in the time domain is determined to be 7:
a DM-RS for the PBCH is configured in a fifth set of time
domain symbol number comprising an integer from {2,
3, 4, 5, 6}, and a subcarrier number comprising an
integer from {0+v, 4+v, 8+v, . . . , 128+v}, wherein v=N
mod 4, and N is related to an identification (ID) of a cell
where the SS/PBCH block is located.

5. The method according to claim 1, wherein, when the
first number of time domain symbols in the SS/PBCH block
in the time domain is determined to be 6:
a DM-RS for the PBCH being configured in a fifth set of
time domain symbol number comprising an integer
from {1, 2, 4, 5}, and a subcarrier number comprising
an integer from {0+v, 4+v, 8+v, . . . , 140+v}, wherein
v=N mod 4, and N is related to an identification (ID) of
a cell where the SS/PBCH block is located.

6. An apparatus comprising:
a memory storing instructions; and
a processor in communication with the memory, wherein,
when the processor executes the instructions, the pro-
cessor is configured to cause the apparatus to perform:
mapping a synchronization signal or physical broadcast
channel (SS/PBCH) block to multiple time domain
symbols in a time domain and continuous subcarriers
in a frequency domain, by:
obtaining a first number of time domain symbols in
the SS/PBCH block in the time domain; and
obtaining a second number of continuous subcarriers
for each time domain symbol in the SS/PBCH
block in a frequency domain,
wherein a base station is configured to determine a
mapping of the SS/PBCH block, the mapping
comprising a set of time domain symbol numbers
and subcarrier numbers in the time domain and the
frequency domain,
wherein:
the first number of time domain symbols in the
SS/PBCH block in the time domain is determined to
be 7 with a time domain symbol number comprising
an integer between 0 and 6, inclusive, or the second
number of continuous subcarriers for each time
domain symbol in the SS/PBCH block in the fre-
quency domain is determined to be 132 with a
subcarrier number comprising an integer between 0
and 131, inclusive; and the mapping of the SS/PBCH
block in the time domain and the frequency domain
comprises at least one of the following: (1) a primary
synchronization signal (PSS) being configured in a
first set of the time domain symbol number compris-
ing 0 and the subcarrier number comprising an
integer between 2 and 128, inclusive, (2) a secondary
synchronization signal (SSS) being configured in a
second set of the time domain symbol number com-
prising 1 and the subcarrier number comprising an
integer between 2 and 128, inclusive, (3) a zero value
being configured in a third set of the time domain
symbol number comprising an integer from {0, 1},
and the subcarrier number comprising an integer
from {0, 1, 129, 130, 131}, or (4) a PBCH being
configured in a fourth set of the time domain symbol
number comprising an integer from {2, 3, 4, 5, 6}, and the subcarrier number comprising an integer between 0 and 131, inclusive; or the first number of time domain symbols in the SS/PBCH block in the time domain is determined to be 6 with a time domain symbol number comprising an integer between 0 and 5, inclusive, or the second number of continuous subcarriers for each time domain symbol in the SS/PBCH block in the frequency domain is determined to be 144 with a subcarrier number comprising an integer between 0 and 143, inclusive; and the mapping of the SS/PBCH block in the time domain and the frequency domain comprises at least one of the following: (1) a PSS being configured in a first set of the time domain symbol number comprising 0 and the subcarrier number comprising an integer between 8 and 134, inclusive, (2) an SSS being configured in a second set of the time domain symbol number comprising 3 and the subcarrier number comprising an integer between 8 and 134, inclusive, (3) a zero value being configured in a third set of the time domain symbol number comprising an integer from {0, 3}, and the subcarrier number comprising an integer from {0, 1, 2, 3, 4, 5, 6, 7, 135, 136, 137, 138, 139, 140, 141, 142, 143}, or (4) a PBCH being configured in a fourth set of the time domain symbol number comprising an integer from {1, 2, 4, 5}, and the subcarrier number comprising an integer between 0 and 143, inclusive; or the first number of time domain symbols in the SS/PBCH block in the time domain is determined to be 5 with a time domain symbol number comprising an integer between 0 and 4, inclusive, or the second number of continuous subcarriers for each time domain symbol in the SS/PBCH block in the frequency domain is determined to be 192 with subcarrier number comprising an integer between 0 and 191, inclusive; and the mapping of the SS/PBCH block in the time domain and the frequency domain comprises at least one of the following: (1) a PSS being configured in a first set of the time domain symbol number comprising 0 and the subcarrier number comprising an integer between 32 and 158, inclusive, (2) an SSS being configured in a second set of the time domain symbol number comprising 1 and the subcarrier number comprising an integer between 32 and 158, inclusive, (3) a zero value being configured in a third set of the time domain symbol number comprising an integer from {0, 1}, and the subcarrier number comprising an integer between 0 and 31, inclusive, and between 159 and 191, inclusive, or (4) a PBCH being configured in a fourth set of the time domain symbol number comprising an integer from {2, 3, 4} and the subcarrier number comprising an integer between 0 and 191, inclusive; or the first number of time domain symbols in the SS/PBCH block in the time domain is determined to be 4 with a time domain symbol number comprising an integer between 0 and 3, inclusive, or the second number of continuous subcarriers for each time domain symbol in the SS/PBCH block in the frequency domain is determined to be 192 with a subcarrier number comprising an integer between 0 and 191, inclusive; and the mapping of the SS/PBCH block in the time domain and the frequency domain comprises at least one of the following: (1) a PSS being configured in a first set of the time domain symbol number comprising 0 and the subcarrier number comprising an integer between 32 and 158, inclusive, (2) an SSS being configured in a second set of the time domain symbol number comprising 2 and the subcarrier number comprising an integer between 32 and 158, inclusive, (3) a zero value being configured in a third set of the time domain symbol number comprising an integer from {0, 2} and the subcarrier number comprising an integer between 24 and 31, inclusive, and between 159 and 167, inclusive, or (4) a PBCH being configured in a fourth set of the time domain symbol number comprising an integer from {0, 2} and the subcarrier number comprising an integer between 0 and 23, inclusive, and between 168 and 191, inclusive, and the time domain symbol number comprising an integer from {1, 3}, and the subcarrier number comprising an integer between 0 and 191, inclusive.

7. The apparatus according to claim 6, wherein:

the SS/PBCH block, in a time domain, comprises: the PSS, the SSS, a demodulation reference signal (DM-RS), or the PBCH.

8. A non-transitory computer program product comprising a computer-readable program medium storing instructions, wherein, the instructions, when executed by a processor, are configured to cause the processor to perform:

mapping a synchronization signal or physical broadcast channel (SS/PBCH) block to multiple time domain symbols in a time domain and continuous subcarriers in a frequency domain, by:

obtaining a first number of time domain symbols in the SS/PBCH block in the time domain; and obtaining a second number of continuous subcarriers for each time domain symbol in the SS/PBCH block in a frequency domain, wherein a base station is configured to determine a mapping of the SS/PBCH block, the mapping comprising a set of time domain symbol numbers and subcarrier numbers in the time domain and the frequency domain, wherein:

the first number of time domain symbols in the SS/PBCH block in the time domain is determined to be 7 with a time domain symbol number comprising an integer between 0 and 6, inclusive, or the second number of continuous subcarriers for each time domain symbol in the SS/PBCH block in the frequency domain is determined to be 132 with a subcarrier number comprising an integer between 0 and 131, inclusive; and the mapping of the SS/PBCH block in the time domain and the frequency domain comprises at least one of the following: (1) a primary synchronization signal (PSS) being configured in a first set of the time domain symbol number comprising 0 and the subcarrier number comprising an integer between 2 and 128, inclusive, (2) a secondary synchronization signal (SSS) being configured in a second set of the time domain symbol number comprising 1 and the subcarrier number comprising an integer between 2 and 128, inclusive, (3) a zero value being configured in a third set of the time domain symbol number comprising an integer from {0, 1}, and the subcarrier number comprising an integer from {0, 1, 129, 130, 131}, or (4) a PBCH being configured in a fourth set of the time domain symbol number comprising an integer from {2, 3, 4, 5, 6}, and the subcarrier number comprising an integer between 0 and 131, inclusive; or the first number of time domain symbols in the SS/PBCH block in the time domain is determined to be 6 with a time domain symbol number comprising an integer between 0 and 5, inclusive, or the second number of continuous subcarriers for each time domain symbol in the SS/PBCH block in the frequency domain is determined to be 144 with a subcarrier number comprising an integer between 0 and 143, inclusive; and the mapping of the SS/PBCH block in the time domain and the frequency domain comprises at least one of the following: (1) a PSS being configured in a first set of the time domain symbol number comprising 0 and the subcarrier number comprising an integer between 8 and 134, inclusive, (2) an SSS being configured in a second set of the time domain symbol number comprising 3 and the subcarrier number comprising an integer between 8 and 134, inclusive, (3) a zero value being configured in a third set of the time domain symbol number comprising an integer from $\{0, 3\}$, and the subcarrier number comprising an integer from $\{0, 1, 2, 3, 4, 5, 6, 7, 135, 136, 137, 138, 139, 140, 141, 142, 143\}$, or (4) a PBCH being configured in a fourth set of the time domain symbol number comprising an integer from $\{1, 2, 4, 5\}$, and the subcarrier number comprising an integer between 0 and 143, inclusive; or the first number of time domain symbols in the SS/PBCH block in the time domain is determined to be 5 with a time domain symbol number comprising an integer between 0 and 4, inclusive, or the second number of continuous subcarriers for each time domain symbol in the SS/PBCH block in the frequency domain is determined to be 192 with subcarrier number comprising an integer between 0 and 191, inclusive; and the mapping of the SS/PBCH block in the time domain and the frequency domain comprises at least one of the following: (1) a PSS being configured in a first set of the time domain symbol number comprising 0 and the subcarrier number comprising an integer between 32 and 158, inclusive, (2) an SSS being configured in a second set of the time domain symbol number comprising 1 and the subcarrier number comprising an integer between 32 and 158, inclusive, (3) a zero value being configured in a third set of the time domain symbol number comprising an integer from $\{0, 1\}$, and the subcarrier number comprising an integer between 0 and 31, inclusive, and between 159 and 191, inclusive, or (4) a PBCH being configured in a fourth set of the time domain symbol number comprising an integer from $\{2, 3, 4\}$ and the subcarrier number comprising an integer between 0 and 191, inclusive; or the first number of time domain symbols in the SS/PBCH block in the time domain is determined to be 4 with a time domain symbol number comprising an integer between 0 and 3, inclusive, or the second number of continuous subcarriers for each time domain symbol in the SS/PBCH block in the frequency domain is determined to be 192 with a subcarrier number comprising an integer between 0 and 191, inclusive; and the mapping of the SS/PBCH block in the time domain and the frequency domain comprises at least one of the following: (1) a PSS being configured in a first set of the time domain symbol number comprising 0 and the subcarrier number comprising an integer between 32 and 158, inclusive, (2) an SSS being configured in a second set of the time domain symbol number comprising 2 and the subcarrier number comprising an integer between 32 and 158, inclusive, (3) a zero value being configured in a third set of the time domain symbol number comprising an integer from $\{0, 2\}$ and the subcarrier number comprising an integer between 24 and 31, inclusive, and between 159 and 167, inclusive, or (4) a PBCH being configured in a fourth set of the time domain symbol number comprising an integer from $\{0, 2\}$ and the subcarrier number comprising an integer between 0 and 23, inclusive, and between 168 and 191, inclusive, and the time domain symbol number comprising an integer from $\{1, 3\}$, and the subcarrier number comprising an integer between 0 and 191, inclusive.

9. The non-transitory computer program product according to claim 8, wherein:

the SS/PBCH block, in a time domain, comprises: the PSS, the SSS, a demodulation reference signal (DM-RS), or the PBCH.

* * * * *